United States Patent [19]

Wasney

[11] Patent Number: 5,204,800
[45] Date of Patent: Apr. 20, 1993

[54] VOLTAGE SURGE SUPPRESSION DEVICE

[76] Inventor: Paul Wasney, 160 Wexford Street, N., Winnipeg, Manitoba, Canada, R3R 0R7

[21] Appl. No.: 563,084

[22] Filed: Aug. 6, 1990

[51] Int. Cl.$^5$ .............................................. H02H 3/22
[52] U.S. Cl. ..................................... 361/111; 361/353
[58] Field of Search ....................... 361/1, 62, 111, 353, 361/430, 432

[56] References Cited

U.S. PATENT DOCUMENTS

| | | |
|---|---|---|
| 3,944,885 | 4/1976 | Sparling . |
| 4,541,030 | 9/1985 | Biegelmeier ................... 361/111 |
| 4,642,733 | 2/1987 | Schacht . |
| 4,796,154 | 1/1989 | Morris et al. ................... 361/353 |
| 4,814,929 | 4/1989 | Ashley . |
| 4,907,118 | 3/1990 | Hames ........................... 361/111 |

FOREIGN PATENT DOCUMENTS

| | | |
|---|---|---|
| 0110070 | 9/1983 | Fed. Rep. of Germany . |
| 3423444 | 9/1985 | Fed. Rep. of Germany . |
| 2010613A | 6/1979 | United Kingdom . |

OTHER PUBLICATIONS

Brochure—Peter Hasse Schutz von Elektronischen Systemen vor Gewitteruberspannungen (II).
Brochure—Tycor Power Conditioning—The Powerful Solution 1990.

*Primary Examiner*—Steven L. Stephan
*Assistant Examiner*—E. To
*Attorney, Agent, or Firm*—Adrian D. Battison; Stanley G. Ade; Murray E. Thrift

[57] ABSTRACT

An electrical device for the purpose of voltage surges is provided for protection in the format of conventional circuit breakers or interrupters (including fusible types). This protective device comprises of one or more electrical components, housed in a suitable enclosure. The format of this enclosure is interfaceable with power panels or panelboards. A plurality of device connections and positions within such an electrical panel, allows this device to connect any or all of the panel power phases or main electric bus bars through the device internal electrical protective network to the panel electrical ground and/or electrical neutral and/or any other reference electrical conductors.

3 Claims, 5 Drawing Sheets

VOLTAGE SURGE SUPPRESSION DEVICE

BACKGROUND OF THE INVENTION

This invention comprises a voltage (or power) surge suppression device of circuit breaker or interrupter (including fusible) format or a format which is interfaceable with power panels or panelboards (including fusible types).

There are voltage surge suppression products on the market in much different formats than outlined herein which provide varying degrees and types of protection for sensitive electrical devices such as computers and electronic equipment. Most of these devices are designed for "point-of-use" application, either in a plug-in or hard wiring mode.

Some are designed for attachment to the electrical panel but on separate units which will be mounted adjacent to but separate from the panel. These therefore require hard wiring and are therefore less convenient. The "point of use" type are easy to install but protect only at one point. Some prior art devices mounted outside a panel can provide some degree of branch circuit protection but this is reduced by the multiple of necessary runs, interconnecting wiring.

SUMMARY OF THE INVENTION

It is one object of the invention to provide a more effective voltage surge suppression device within normal building electrical distribution systems.

The term "voltage surge" in alternating current terms used in this document is taken to be any aberation to the normal sinusoidal voltage waveform, both transient as well as steady state in nature. The consequence of such voltage surge is a current surge. Products used in the industry to alleviate such voltage surges are often referred to as power surge suppressors or power conditioners. The term "voltage" surge suppression is used throughout this document. This invention also applies to direct current or DC applications.

According to the invention therefore there is provided an electrical device for the purpose of voltage surge (commonly known as power surge) protection or suppression in the format of a conventional circuit breaker or interrupter (including fusible type). This protection device comprises of one or more electrical components, housed in a suitable enclosure. The format of this enclosure is interfaceable with power panels or panelboards. A plurality of device connections and positions within such an electrical panel, allows this device to connect any or all of the panel power phases or main electric bus bars through the device internal electrical protective network to the panel electrical ground and/or electrical neutral and/or any other reference electrical conductors. Upon a voltage surge condition or during the presence of damaging harmonic voltages, this device protective circuitry will operate to electrically dampen or suppress these conditions. One very damaging condition is high transient voltages, such as during severe lightning storms. These high transient voltages can be present on any number of the main incoming neutral and electrical phases or lines. Such a device will choke or clamp this transient voltage down to a much lower predetermined safe voltage level. The technology of voltage surge suppression and the degree and type of protection provided can be varied and is applied to this device.

The application of this device at a panel provides an electrical circuit of lowest possible impedance to incoming voltage (or power) surges and hence provides the most effective and convenient location for suppression of such electrical disturbances.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DETAILED DESCRIPTION

Figure 1:
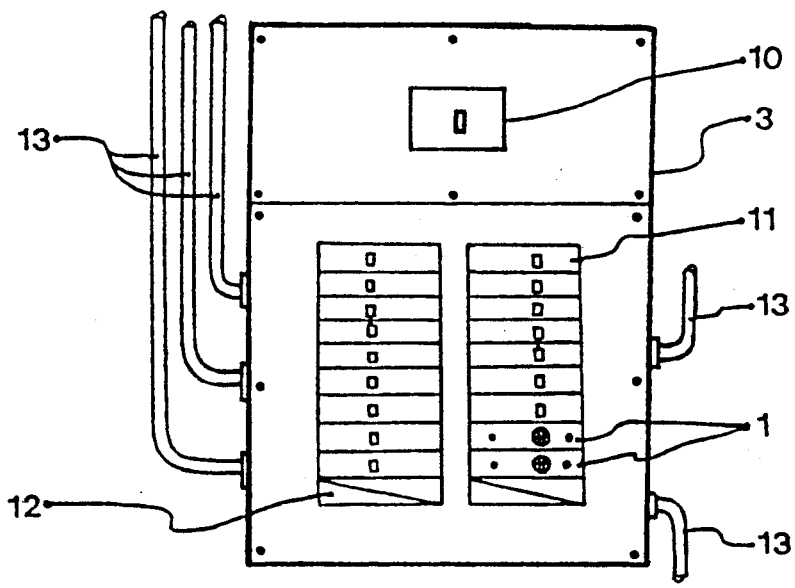
FIG. 1 is a front elevational view of a mounting of a surge suppression device according to the invention in a typical panel.
Figure 2:
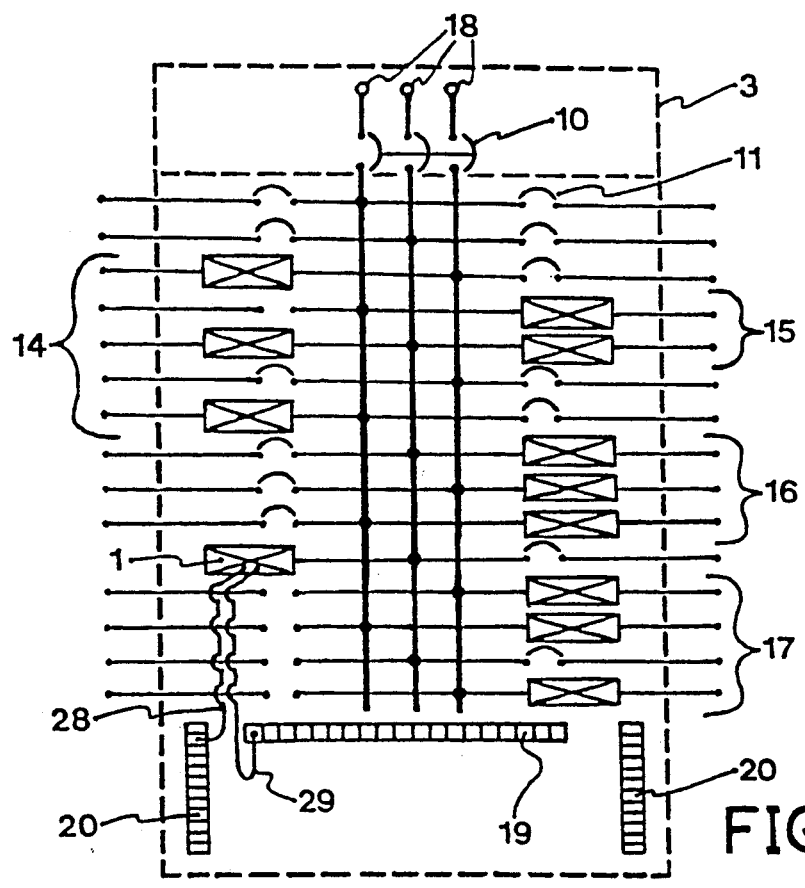
FIG. 2 is a panel circuit schematic illustrating a plurality of connections for the mounting of suppression devices according to the invention for different phases.
Figure 5:
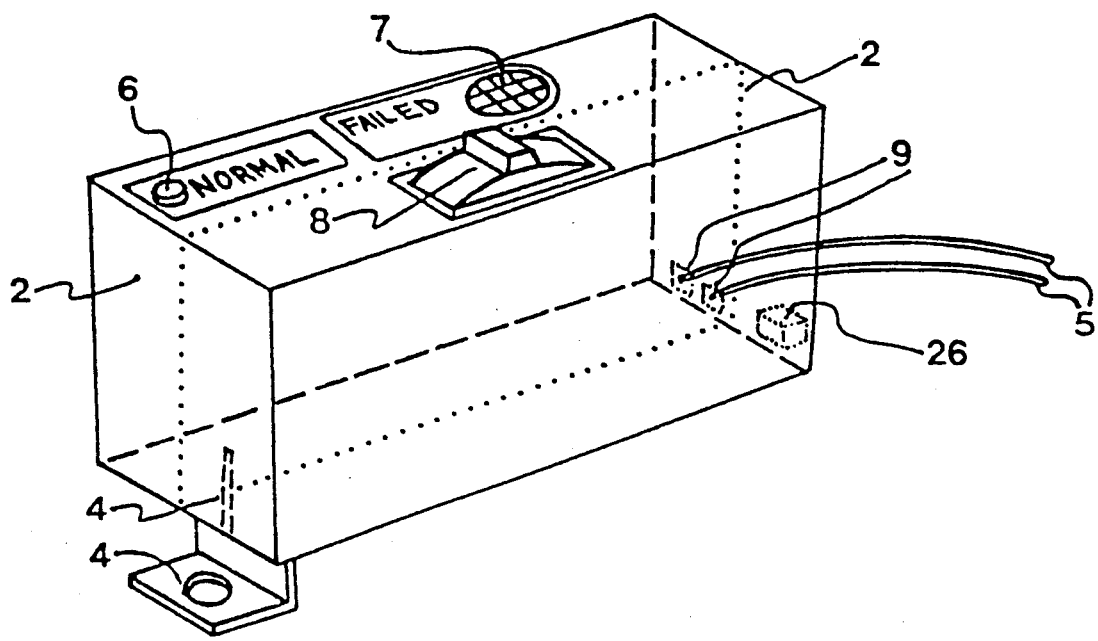
FIG. 5 is an isometric view of the basic construction, of a single pole surge suppression device in conjunction with a conventional circuit breaker indicating single unit or one piece construction. Multipole versions of this device comprise essentially multiples of the single pole device indicated. Protective circuitry of this device should preferably be on the load side of the integral circuit breaker portion.

This invention utilizes the existing panel 3 as the mounting location for voltage surge suppressors 1 in a circuit breaker or interrupter format. Thus any electrical disturbance from the incoming electrical phases 18 or lines to the panel 3 or even from any of the branch electrical circuits 13 can be suppressed on any or all of the electrical phases 18 or lines right at this panel 3. Suppression at multiple locations within a building can be either eliminated or minimized depending upon equipment sensitivity and degree of protection required. The convenience of such suppression technology in circuit breaker or interrupter format allows the protection to be placed into any existing panels 3, on either selected or all panel phase which are connected at a load side terminal 26 (FIG. 5). Existing panel spaces 12 for future breakers are all candidate locations for this device. This device 1 can be either snapped in place or bolted on 4 to the existing mode of connection within a panel 3 and then simply electrically connected to existing panel 3 terminals as indicated in FIG. 2. Particularly in commercial establishments, many panels 3 are flush mounted or recessed into finished walls and in cases where panels are surface mounted, exterior space around this panel 3 is often very limited. This invention offers a distinct convenience by mounting within a panel 3. Also, this invention capitalize on the proven track record of insulation properties of circuit breaker or interruptor enclosures 2. Since this device electrically protects existing main 10 and branch circuit breakers 11 from damaging overvoltages, circuit breaker or interruptor reliability is enhanced. This invention also provides additional safety in that it provides inherent protection of branch circuit wiring 13 to the point of application of sensitive electrical devices and electronic equipment.

This device comprises of one, two (22), three pole (23) versions for the most popular applications, but can be extended beyond these pole versions to achieve special or customized protection requirements in multiple pole (24) format. Normal art would apply suppression protection mainly at the point of application of sensitive electrical devices and equipment, thereby subjecting the panel 3 and branch circuit wiring to higher electrical voltage stresses due to the attenuation effect of the branch wiring from power disturbances emanating from an associated panel to these devices.

Conventional protection offered by overcurrent normal art technology (circuit breakers and fuses) can be applied in conjunction with this invention. This device 1 can be applied to provide coordinated protection for normal art suppression technology devices by providing protection against severe electrical disturbances (normally transient in nature) for normal art suppression technology devices. These devices in turn can now be used to protect sensitive electrical devices against less severe disturbances.

Type of protection of this device 1 to include, but not limited to the following:

Common Mode: Voltage disturbances between electrical line 18 and ground 20, and between electrical neutral 19 and ground 20;

Normal Mode: Voltage disturbances between electrical line 18 and electrical neutral 19;

Interphase Mode Voltage: Disturbances between electrical lines 18 or phases where there are two or more electrical phases.

There is no limitation or restriction on the protection device voltage or amperage rating. Most popular application would be on conventional 120 volt circuits.

This electrical device 1 should have essentially rectilinear geometry, and of a type which is applied directly into existing circuit breaker or interrupter type power panels 3 or panel boards. Electrically, this device can contain one or more poles in much the same format as current circuit breakers or interrupters. These devices 1 can be typically of plug-in, bolt-on, draw-out, or any other configuration within these panels 3. The most practical method would be to use essentially the same circuit breaker molds or frames of various manufacturers and to use the same housings currently used for fuses.

This device format can have either suitable terminals 9 or suitable lengths of insulated leads 5 for connection with a panel 3 as illustrated. The general construction of this device should be a suitable insulating type mold 2 with internal protective component 1A. This mold 2 can be conveniently and essentially the same as that used in conventional molded case circuit breakers 11 and also of a larger suitable mold or enclosure for applications in large power panels containing either fixed mounted or draw out type air circuit breakers. This mold or enclosures 2 to adequately house internal protective components in a manner so as to provide adequate electrical insulation to withstand operational surge or disturbance voltages and to provide adequate thermal dissipative properties to release the resulting heat generated by potential power surges.

For ease of maintenance, this device 1 includes an option of NORMAL and/or FAILED indication diagnostics 6. Such indication can be but not be limited to either L.E.D. (light emitting diode), pilot light, and/or some audible 7 means. This device to include an option consisting of a "PUSH-TO-TEST" (not illustrated) or similar manual diagnostic feature which electrically tests or checks for the normal operational characteristics of the internal protective component 1A. The option of a manually operable disconnecting mechanism 8 normally associated with a circuit breaker or interrupter mechanism is part of this device 1. Integrated with this disconnecting means is a device protective fuse option for safety reasons only in the event that the internal protective circuitry should fail in a short circuit mode upon severe surge conditions.

In the case of conventional power panels 3 or panelboards, the device 1 construction is such that it can be installed in the same manner 4 as a circuit breaker 11 or interrupter with very little modification, if any, to the protective cover plate (generally metallic) over the panel 3. The flexibility of installing a plurality 14, 15, 16, 17 these devices anywhere within a panel 3 (space permitting) exists as illustrated in FIG. 2.

Figure 10:
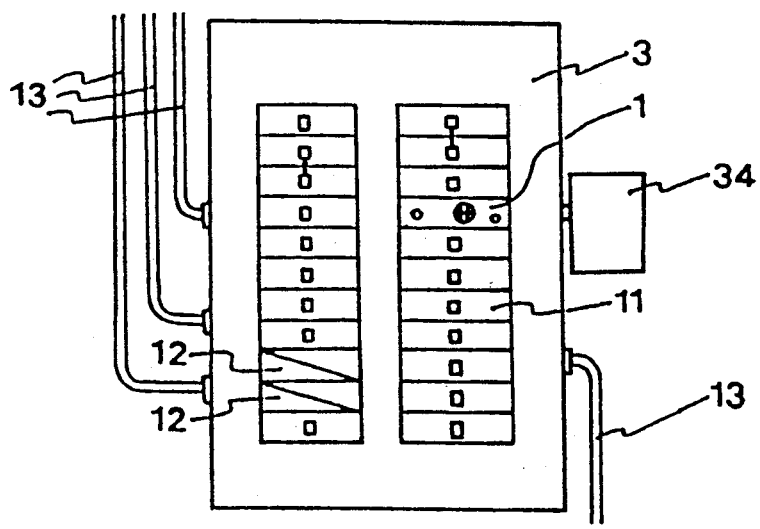
FIG. 10 is a front elevational view similar to that of FIG. 1 showing a panel mounted surge suppression device in conjunction with a coordinated auxiliary suppression or protective equipment for more stringent requirements

Situations requiring greater degree of protection can be accomplished by increasing the device 1 size and volume, and retaining the necessary construction and geometry for mounting within a panel 3. Where the protection requirement dictates that the volume of protective components normally can not be housed in a circuit breaker or interruptor housing, then this device 1 can be utilized in conjunction with auxiliary surge suppression equipment 34 mounted immediately outside the panel 3 or panelboard as illustrated in FIG. 10.

Figure 3:
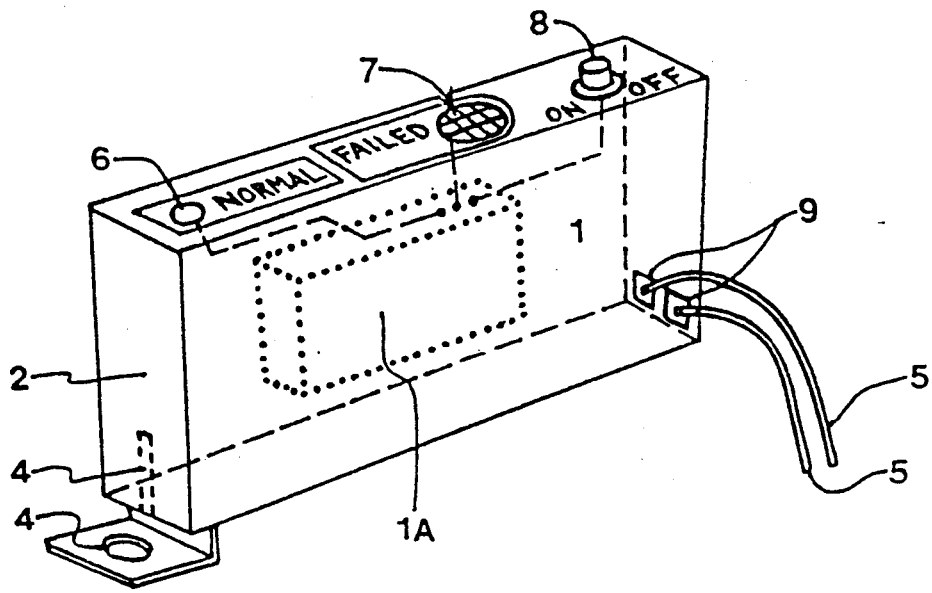
FIG. 3 is an isometric view of a single-pole surge suppression device according to the invention.
Figure 4:
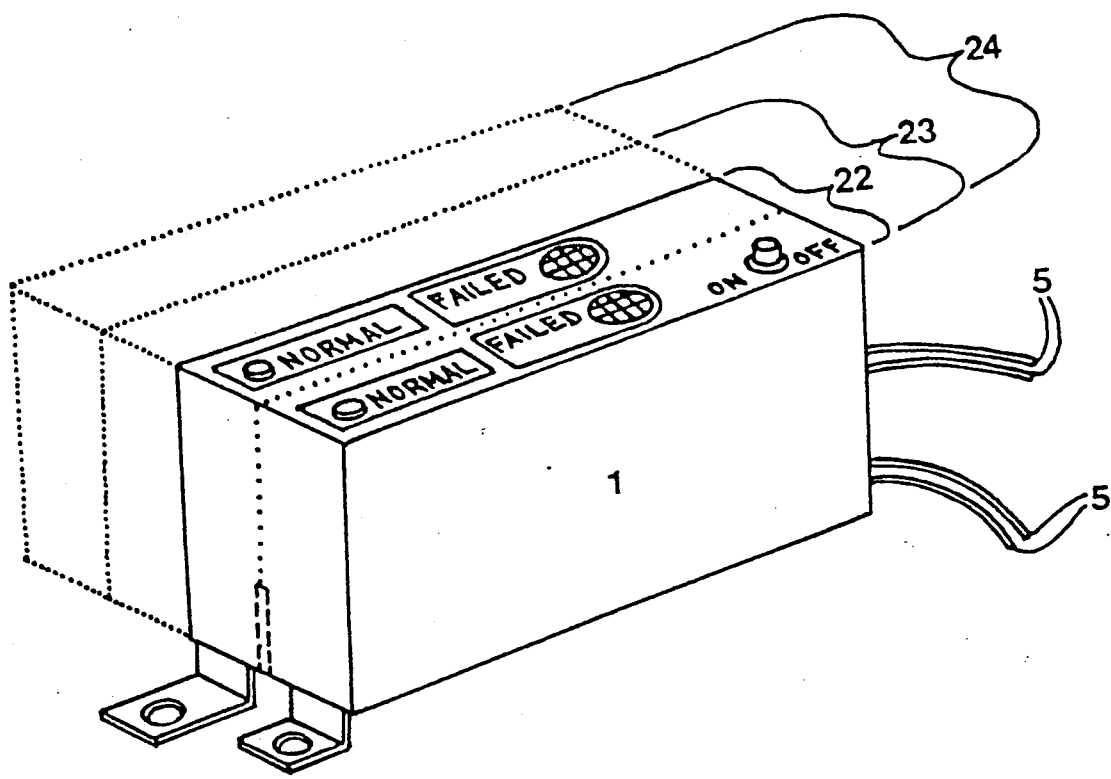
FIG. 4 is a similar isometric view of a multi-pole device similar to that of FIG. 3.

Turning now specifically to FIG. 3, a typical example of a device according to the present invention is shown including the housing 1 which is shaped in the manner of the circuit breaker for an electrical panel of the type for which the device is designed. The housing can simulate exactly the housing of a circuit breaker or can actually be the housing of a circuit breaker. The surge suppression circuitry is indicated schematically as 1A but is of conventional design and hence will not be described herein. Surge suppression circuitry is well known and various different designs can be used depending upon the amount of surge suppression required. The details will be well apparent to one skilled in the art.

Directly attached to the housing is a connector 4 which is designed for attachment to the bus of the panel for which the device is designed. The shape of the connector will therefore be conventional. The surge suppression circuitry 1A is connected to the connector 4 and also is attached by couplings 9 to wires 5 which communicate respectively to the neutral return 19 and to the ground 20 of the panel 3 for the surge suppression action.

The device further includes a normal indicating light 6 indicating that the device is in normal operation, a failure indicating light 7 to indicate that the surge suppression device has failed due to overload and an on-off switch 8 with fuse protection for safety purposes.

In an alternative arrangement (not shown) a removable fuse can be added between the live connection 4 and the circuitry 1A for replaceable failure in the event of an overload. In addition the housing may include a pressure release or frangible section (not illustrated) in the event that the surge is sufficiently powerful to cause violent damage to the circuitry.

The surge suppression device of the present invention has the following advantages.

1. The position of the device within the electrical panel ensures that the electrical disturbances or power surges are suppressed within the electrical panel before these disturbances are transmitted to branch circuits.

2. The suppression within the panel offers protection to all of the branch circuits emanating from this panel if all phases are protected. It is of course possible to select that the protection be applied only to certain phases of the panel. This protection applies to disturbances from the incoming electrical phases to a panel or to disturbances on any one of the branch circuits from this panel.

3. The device offers the convenience of incorporating protection within new or existing panels. Where a greater degree of protection is required, this device can be used in conjunction with auxiliary surge protective equipment external to the panel.

4. The application of this invention places the suppression circuitry where impedance to incoming electrical line disturbances is the lowest within a building and where the destructive effects of the associated disturbance voltages are or can be the greatest. By limiting or clamping the destructive disturbance voltages for example, from lightning strikes and by dissipating this disturbance energy at the panel, associated branch circuits with sensitive electrical equipment at the end of the branch wiring will be subjected to the lower disturbance voltage.

5. At the point of application, this device converts a level of disturbance voltage into a disturbance current. First, through this process disturbance currents (generally momentary in nature) can be significant enough in terms of amplitude and time duration to cause the next upstream conventional overcurrent protection device (circuit breaker or fuse) to operate, thus complementing this device in its protective role. In case of such high disturbance current levels, a conventional overcurrent protection device normally will have the required interrupting capacity to handle such current.

6. The application of this device in a panel particularly as part of an integral main breaker enables the possibility to identify sources of voltage disturbances quite readily. During the case of severe disturbances, the operation of a main breaker can indicate an external source of disturbance.

7. If there is a circuit which generates disturbances, this can cause the branch circuit breaker device (as in FIG. 5) to operate thus clearing the source of the disturbance. Although the next upstream breaker will also sense this disturbance, the relatively lower ampere rating of the branch breaker will generally make it more sensitive and operate first.

8. It may be possible to utilize the operation indication (failure mode only) of a device in conjunction with the operation of a main breaker or fuses to identify external sources of severe disturbances providing this indication in cases of insurance claims.

9. This device can provide electrical protection against voltage surges such as transient voltages, spike voltages, harmonic voltages and an assortment of voltage and current aberations which deviate from normal sinusoidal voltage wave form for AC and very uniform level for DC. The device can be used to protect against disturbances between line and neutral, line and ground, neutral and ground, and line to line on single phase, three phase and poly phase alternating current systems This device also can be adapted to offer surge protection on DC systems.

10. The use of the insulation system available on the conventional circuit breaker ensures that the device will have a very good ability to withstand voltage surges.

11. During the normal operation of overcurrent devices such as circuit breakers and fuses, the sudden interruption of overload or fault current results in a momentary transient overvoltage and current surge condition on the panel and on part or all of the branch circuits. This device can sense this condition and momentarily limit or clamp this overvoltage and surge condition. The device can be incorporated integrally with a molded case circuit breaker as well as an air circuit breaker to offer this suppression feature.

12. The application of this device as outlined will subject the panel external wiring, and all loads on the panel circuits to less severe power disturbances and hence provide a greater margin of safety and even prolong equipment life. Degradation of electrical insulation systems is very great during surge conditions and is lowered significantly if surge conditions are reduced.

Figure 6:
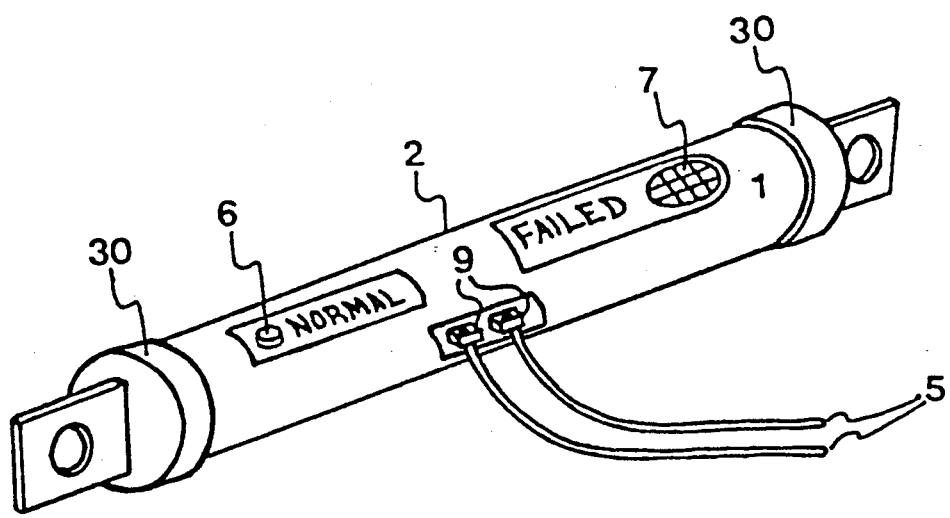
FIG. 6 is an isometric view of a single pole surge suppression device in the format of a linear type fuse.
Figure 7:
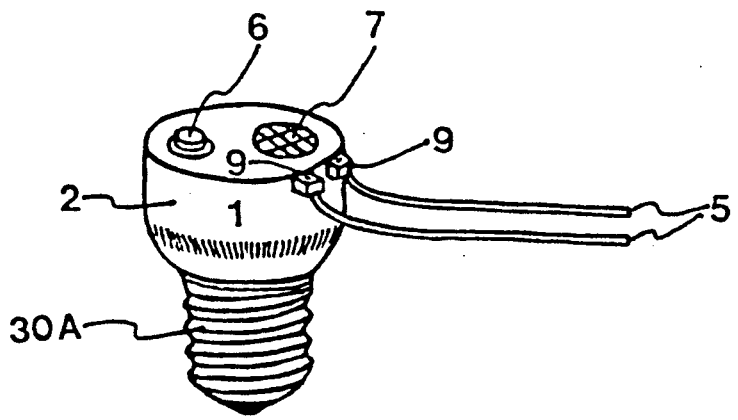
FIG. 7 is an isometric view of a single pole surge suppression device in the format of a screw-in type fuse.
Figure 8:
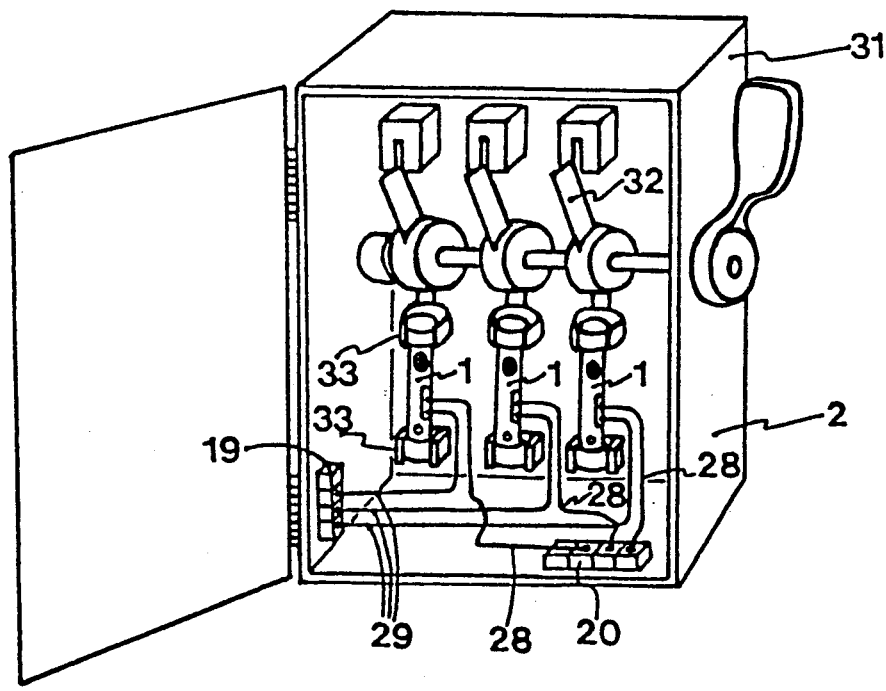
FIG. 8 is an isometric view of a typical application of the fuse format of FIG. 6 in a conventional fuseable over current device.

13. The application of this device in a fuse format will allow its use in a conventional fusable switches 31 as illustrated in FIG. 8 as well as fusable panels 3 or panelboards. Construction of the device in the popular linear type fuse housing as illustrated in FIG. 6 with conventional end caps 30 and either integral protective circuitry leads 5 or side terminals 9 provides an effective device. In a normal switch mechanism the existing handle 8 and blades 32 can be used as the disconnecting means for this device. The device is held in place in conventional fuse holders 33 in a switch mechanism. The device leads 5 are connected to the neutral 19 and ground terminal lugs 20. The neutral wiring 29 is separated from the ground terminal wiring 28. This device can also be constructed in a screw-in type fuse format with a cylindrical or round body as illustrated in FIG. 7 as one possible version, but with a screw-in base assembly 30A.

Figure 9:
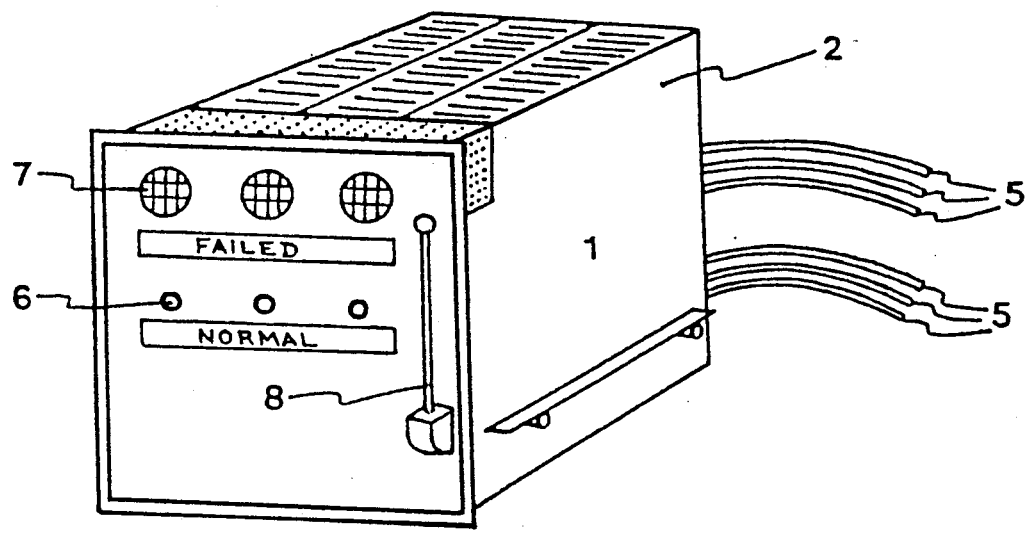
FIG. 9 is an isometric view of a typical construction of a surge suppressor in a conventional air circuit breaker format.

14. The application of this device in a conventional air circuit breaker format provides relatively large volume for surge suppression circuitry. These type of circuit breakers are normally three pole for three phase applications and lend themselves conveniently for the mounting of three single pole suppressors on a regular air circuit breaker frame as illustrated in FIG. 9. Insulation systems associated with air circuit breakers housing 2 have proven very reliable within the industry.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An electrical distribution panel for supplying electrical power from a main supply to a plurality of circuits comprising a main housing, a main supply bus mounted in the main housing, a neutral return, a ground connection, a first plurality of overcurrent circuit interrupter devices each having a housing containing circuit interrupter means and a contact terminal for engaging said main supply bus, a second plurality of receptacle locations in the main housing, each shape and arranged to receive one of said plurality of overcurrent circuit interrupter devices with the housing thereof received within the respective receptacle location and the contact terminal thereof engaged with said main supply bus, the second plurality being greater than the first plurality so as to leave at least one of said receptacle locations free from a respective interrupter device, and a voltage surge suppression device comprising a housing shaped and arranged for mounting in one of said receptacle locations, a contact element mounted in the housing of the suppression device for directly contacting the bus, voltage surge suppression circuit means provided in the housing of the suppression device responsive to a voltage surge, and at least two connector lead means, each connecting the circuit means to a respective one of the said neutral return and said ground connection, said housing of said suppression device being mounted in one of said receptacle locations which is free from an interrupter device and an overcurrent circuit interrupter device connected integrally with said voltage surge suppression circuit means within said housing of said suppression device, said overcurrent circuit interrupter device and said voltage surge suppression circuit means being arranged such that an overvoltage at said main supply bus is converted by said voltage surge suppression circuit means to an overcurrent through said voltage surge suppression circuit means which acts to actuate said overcurrent circuit interrupter device, and said voltage surge suppression circuit means being arranged to be responsive to any one of transients, spikes, harmonics, over/under voltages and high frequency interference.

2. The distribution panel according to claim 1 including a second main supply bus for supplying a second one of a plurality of phases of the main supply, the voltage surge suppression device including a second contact element for engaging the second main supply bus for providing separate surge protection for each of said phases.

3. The distribution panel according to claim 1 wherein the housing of the suppression device is shaped and design such that it substantially fills a plurality of said receptacle locations arranged side by side.

* * * * *